(12) United States Patent
Arnold et al.

(10) Patent No.: US 9,266,092 B2
(45) Date of Patent: Feb. 23, 2016

(54) AUTOMOTIVE CATALYST COMPOSITES HAVING A TWO-METAL LAYER

(71) Applicants: BASF Corporation, Florham Park, NJ (US); BASF SE, Ludwigshafen (DE)

(72) Inventors: Mirko Arnold, Bedminster, NJ (US); Stefan Kotrel, Weinheim (DE); Attilio Siani, Hannover (DE); Stephan Siemund, Pattensen (DE); Thomas Schmitz, Wunstorf (DE); Burkhard Rabe, Husum (DE); Gary A Gramiccioni, Madison, AL (US); Oliver Seel, Nienburg/Weser (DE); Torsten Neubauer, Langenhagen (DE); Knut Wassermann, Princeton, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 14/157,865

(22) Filed: Jan. 17, 2014

(65) Prior Publication Data

US 2014/0205523 A1    Jul. 24, 2014

Related U.S. Application Data

(60) Provisional application No. 61/756,139, filed on Jan. 24, 2013.

(51) Int. Cl.
*B01D 50/00* (2006.01)
*B01D 53/34* (2006.01)
(Continued)

(52) U.S. Cl.
CPC .............. *B01J 23/63* (2013.01); *B01D 53/945* (2013.01); *B01J 37/0244* (2013.01);
(Continued)

(58) Field of Classification Search
CPC ............ B01J 21/04; B01J 21/06; B01J 23/10; B01J 23/40; B01J 23/44; B01J 23/56; B01J 23/58; B01J 23/63; B01D 53/56; B01D 53/8628; B01D 53/864; B01D 53/8643; B01D 53/92; B01D 53/94
USPC ........... 502/302–304, 327–328, 332–33, 339, 502/349, 355, 439, 527.12, 527.13; 423/213.5, 239.1, 247; 422/168, 170, 422/177, 180
See application file for complete search history.

(56) References Cited

U.S. PATENT DOCUMENTS

| 3,929,965 | A | 12/1975 | Kim et al. |
| 4,171,288 | A | 10/1979 | Keith et al. |

(Continued)

FOREIGN PATENT DOCUMENTS

| EP | 0337809 | 10/1989 |
| EP | 0566401 | 10/1993 |

(Continued)

OTHER PUBLICATIONS

PCT International Search Report and Written Opinion in PCT/US2014/012862, mailed Apr. 21, 2014, 15 pages.

(Continued)

*Primary Examiner* — Cam N. Nguyen
(74) *Attorney, Agent, or Firm* — Womble Carlyle Sandridge & Rice, LLP

(57) ABSTRACT

Provided are catalyst composites whose catalytic material is effective to substantially simultaneously oxidize carbon monoxide and hydrocarbons and reduce nitrogen oxides. The catalyst composites have a two-metal layer on a carrier, the two-metal layer comprising a rhodium component supported by a first support comprising a refractory metal oxide component or a first ceria-zirconia composite; a palladium component supported by a second support comprising a second ceria-zirconia composite; one or more of a promoter, stabilizer, or binder; wherein the amount of the total of the first and second ceria-zirconia composites in the two-metal layer is equal to or greater than the amount of the refractory metal oxide component. Methods of making and using the same are also provided.

30 Claims, 1 Drawing Sheet

Pd/OSC + Rh/Alu, OSC ≥ Al

Single Slurry – Two-Metal Layer
Thermally-Fixed PM

(51) Int. Cl.
*F01N 3/00* (2006.01)
*F23J 11/00* (2006.01)
*B01D 53/56* (2006.01)
*B01D 53/94* (2006.01)
*B01J 23/00* (2006.01)
*B01J 23/02* (2006.01)
*B01J 23/08* (2006.01)
*B01J 23/10* (2006.01)
*B01J 23/42* (2006.01)
*B01J 23/44* (2006.01)
*B01J 23/56* (2006.01)
*B01J 23/58* (2006.01)
*B01J 21/04* (2006.01)
*B01J 23/63* (2006.01)
*B01J 37/02* (2006.01)
*F01N 3/10* (2006.01)
*B01J 35/00* (2006.01)
*B01J 35/10* (2006.01)

(52) U.S. Cl.
CPC .... *B01J 37/0248* (2013.01); *B01D 2255/1021* (2013.01); *B01D 2255/1023* (2013.01); *B01D 2255/1025* (2013.01); *B01D 2255/407* (2013.01); *B01D 2255/908* (2013.01); *B01D 2255/9022* (2013.01); *B01D 2258/014* (2013.01); *B01J 35/0006* (2013.01); *B01J 35/1014* (2013.01); *B01J 35/1019* (2013.01); *B01J 35/1061* (2013.01); *F01N 3/101* (2013.01); *F01N 2510/0684* (2013.01); *Y02T 10/22* (2013.01)

(56) References Cited

U.S. PATENT DOCUMENTS

| | | | |
|---|---|---|---|
| 4,448,895 A | 5/1984 | Ono et al. | |
| 4,823,842 A * | 4/1989 | Toliusis | 137/625.65 |
| 5,015,617 A | 5/1991 | Ohata et al. | |
| 5,248,650 A | 9/1993 | Sekiba et al. | |
| 5,260,249 A | 11/1993 | Shiraishi et al. | |
| 5,278,113 A | 1/1994 | Ono et al. | |
| 5,407,880 A | 4/1995 | Ikeda et al. | |
| 5,459,119 A | 10/1995 | Abe et al. | |
| 5,525,307 A | 6/1996 | Yasaki et al. | |
| 5,556,825 A | 9/1996 | Shelef et al. | |
| 5,618,772 A | 4/1997 | Suda et al. | |
| 5,702,675 A | 12/1997 | Takeshima et al. | |
| 5,814,576 A | 9/1998 | Yamamoto | |
| 5,814,577 A | 9/1998 | Park et al. | |
| 5,910,466 A | 6/1999 | Yamashita et al. | |
| 5,916,839 A | 6/1999 | Pak et al. | |
| 5,958,829 A | 9/1999 | Domesle et al. | |
| 5,990,038 A | 11/1999 | Suga et al. | |
| 6,022,825 A | 2/2000 | Andersen et al. | |
| 6,047,544 A | 4/2000 | Yamamoto et al. | |
| 6,069,111 A | 5/2000 | Yamamoto et al. | |
| 6,080,375 A | 6/2000 | Mussmann et al. | |
| 6,093,377 A | 7/2000 | Iizuka et al. | |
| 6,103,207 A | 8/2000 | Chattha et al. | |
| 6,103,660 A | 8/2000 | Yperen et al. | |
| 6,143,691 A | 11/2000 | Shiraishi et al. | |
| 6,146,602 A | 11/2000 | Marula et al. | |
| 6,165,429 A | 12/2000 | Ikeda et al. | |
| 6,221,804 B1 * | 4/2001 | Yamada et al. | 502/304 |
| 6,261,989 B1 | 7/2001 | Tanaka et al. | |
| 6,276,132 B1 | 8/2001 | Kanesaka et al. | |
| 6,294,140 B1 | 9/2001 | Mussmann et al. | |
| 6,334,986 B2 | 1/2002 | Gieshoff et al. | |
| 6,348,430 B1 | 2/2002 | Lindner et al. | |
| 6,350,421 B1 | 2/2002 | Strehlau et al. | |
| 6,370,870 B1 | 4/2002 | Kamijo et al. | |
| 6,475,951 B1 | 11/2002 | Domesle et al. | |
| 6,491,985 B2 | 12/2002 | He | |
| 6,499,294 B1 | 12/2002 | Katoh et al. | |
| 6,503,862 B1 | 1/2003 | Yamamoto | |
| 6,517,784 B1 | 2/2003 | Iizuka et al. | |
| 6,518,213 B1 | 2/2003 | Yamamoto et al. | |
| 6,524,992 B2 | 2/2003 | Mussmann et al. | |
| 6,537,511 B1 | 3/2003 | Chattha et al. | |
| 6,557,342 B2 | 5/2003 | Suga et al. | |
| 6,569,392 B1 | 5/2003 | Li et al. | |
| 6,576,199 B1 | 6/2003 | Liu et al. | |
| 6,602,479 B2 | 8/2003 | Taniguchi et al. | |
| 6,602,820 B1 | 8/2003 | Gobel et al. | |
| 6,613,299 B2 | 9/2003 | Dang et al. | |
| 6,617,276 B1 | 9/2003 | Ballinger et al. | |
| 6,625,976 B1 | 9/2003 | Andersen et al. | |
| 6,651,424 B1 | 11/2003 | Twigg | |
| 6,667,012 B1 | 12/2003 | Anand et al. | |
| 6,709,643 B1 | 3/2004 | Ozkan et al. | |
| 6,729,125 B2 | 5/2004 | Suga et al. | |
| 6,750,168 B2 | 6/2004 | Yan et al. | |
| 6,753,294 B1 | 6/2004 | Brisley et al. | |
| 6,756,336 B2 | 6/2004 | Kasahara et al. | |
| 6,767,855 B2 | 7/2004 | Kasahara et al. | |
| 6,797,668 B2 | 9/2004 | Yoshikawa | |
| 6,808,687 B1 | 10/2004 | Uenishi et al. | |
| 6,823,662 B1 | 11/2004 | Yamamoto et al. | |
| 6,832,473 B2 | 12/2004 | Kupe et al. | |
| 6,846,466 B2 | 1/2005 | Matsumoto et al. | |
| 6,852,666 B1 | 2/2005 | Bouly et al. | |
| 6,858,193 B2 | 2/2005 | Ruwisch et al. | |
| 6,863,874 B1 | 3/2005 | Twigg | |
| 6,864,214 B2 | 3/2005 | Uenishi et al. | |
| 6,881,384 B1 | 4/2005 | Uenishi et al. | |
| 6,881,390 B2 | 4/2005 | Yaluris et al. | |
| 6,883,305 B1 | 4/2005 | Iizuka et al. | |
| 6,887,444 B1 | 5/2005 | Yamamoto | |
| 6,893,998 B2 | 5/2005 | Shigapov et al. | |
| 6,896,857 B2 | 5/2005 | Nakamura et al. | |
| 6,953,769 B2 | 10/2005 | Yamada et al. | |
| 6,956,007 B2 | 10/2005 | Cai et al. | |
| 6,967,186 B2 | 11/2005 | Takaya et al. | |
| 7,005,404 B2 | 2/2006 | He | |
| 7,030,055 B2 | 4/2006 | Yaluris et al. | |
| 7,037,878 B2 | 5/2006 | Liu et al. | |
| 7,041,622 B2 | 5/2006 | Nunan et al. | |
| 7,071,141 B2 | 7/2006 | Gandhi et al. | |
| 7,081,430 B2 | 7/2006 | Uenishi et al. | |
| 7,082,753 B2 | 8/2006 | Dalla Betta et al. | |
| 7,093,428 B2 | 8/2006 | LaBarge et al. | |
| 7,097,817 B2 | 8/2006 | Brisley et al. | |
| 7,107,764 B1 | 9/2006 | Opris et al. | |
| 7,115,236 B2 | 10/2006 | Sekiba et al. | |
| 7,125,528 B2 | 10/2006 | Besecker et al. | |
| 7,134,272 B2 | 11/2006 | Niwa et al. | |
| 7,135,153 B2 | 11/2006 | Bartley et al. | |
| 7,138,358 B2 | 11/2006 | Huang et al. | |
| 7,163,661 B2 | 1/2007 | Yamamoto et al. | |
| 7,163,668 B2 | 1/2007 | Bartley et al. | |
| 7,165,393 B2 | 1/2007 | Betta et al. | |
| 7,175,822 B2 | 2/2007 | Nakatsuji | |
| 7,181,906 B2 | 2/2007 | Dalla Betta et al. | |
| 7,229,948 B2 | 6/2007 | Chigapov et al. | |
| 7,276,212 B2 * | 10/2007 | Hu et al. | 422/177 |
| 7,297,175 B2 | 11/2007 | Miwa | |
| 7,326,669 B2 | 2/2008 | He et al. | |
| 7,329,629 B2 | 2/2008 | Gandhi et al. | |
| 7,357,900 B2 | 4/2008 | Bartley et al. | |
| 7,384,889 B2 | 6/2008 | Ito | |
| 7,389,638 B2 | 6/2008 | Weissman et al. | |
| 7,396,516 B2 | 7/2008 | Fisher et al. | |
| 7,399,729 B2 | 7/2008 | Rocha et al. | |
| 7,431,749 B2 | 10/2008 | Kim et al. | |
| 7,431,895 B2 | 10/2008 | Pfeifer et al. | |
| 7,442,346 B2 | 10/2008 | Ikeda et al. | |
| 7,446,076 B2 | 11/2008 | Miyoshi et al. | |
| 7,485,271 B2 | 2/2009 | Golunski et al. | |
| 7,498,288 B2 | 3/2009 | Matsueda et al. | |
| 7,533,521 B2 | 5/2009 | Dalla Betta et al. | |
| 7,563,746 B2 | 7/2009 | Nunan | |

(56) References Cited

U.S. PATENT DOCUMENTS

| | | |
|---|---|---|
| 7,572,422 B2 | 8/2009 | Sekiba et al. |
| 7,584,603 B2 | 9/2009 | Kupe et al. |
| 7,585,811 B2 | 9/2009 | Nakamura et al. |
| 7,598,198 B2 | 10/2009 | Wang et al. |
| 7,601,669 B2 | 10/2009 | Nakamura et al. |
| 7,601,670 B2 | 10/2009 | Yasuda et al. |
| 7,601,671 B2 | 10/2009 | LaBarge |
| 7,604,779 B2 | 10/2009 | Liu et al. |
| 7,610,752 B2 | 11/2009 | Dalla Betta et al. |
| 7,612,014 B2 | 11/2009 | Wang et al. |
| 7,625,529 B2 | 12/2009 | Ohno et al. |
| 7,625,836 B2 | 12/2009 | Matsueda et al. |
| 7,638,460 B2 | 12/2009 | Nakamura et al. |
| 7,641,875 B1 | 1/2010 | Golden |
| 7,674,744 B2 | 3/2010 | Shiratori et al. |
| 7,691,772 B2 | 4/2010 | Saito |
| 7,694,512 B2 | 4/2010 | Katoh et al. |
| 7,713,908 B2 | 5/2010 | Yamamoto et al. |
| 7,713,911 B2 | 5/2010 | Wakamatsu et al. |
| 7,718,150 B2 | 5/2010 | Theis et al. |
| 7,718,562 B2 | 5/2010 | Gandhi et al. |
| 7,727,928 B2 | 6/2010 | Brazdil et al. |
| 7,749,472 B2 * | 7/2010 | Chen et al. ............... 423/213.2 |
| 7,758,834 B2 * | 7/2010 | Chen et al. ............... 423/213.2 |
| 7,802,420 B2 | 9/2010 | Poojary et al. |
| 7,811,961 B2 | 10/2010 | Jen et al. |
| 7,811,962 B2 * | 10/2010 | Hu et al. ............... 502/304 |
| 7,816,300 B2 | 10/2010 | Takeuchi et al. |
| 7,820,123 B2 | 10/2010 | Ikeda et al. |
| 7,825,063 B2 | 11/2010 | Takeuchi et al. |
| 7,833,930 B2 | 11/2010 | Kikuchi et al. |
| 7,851,403 B2 | 12/2010 | Kunieda et al. |
| 7,870,724 B2 | 1/2011 | Ura et al. |
| 7,871,956 B2 | 1/2011 | Wakita et al. |
| 7,875,250 B2 | 1/2011 | Nunan |
| 7,888,282 B2 | 2/2011 | Minami et al. |
| 7,919,050 B2 | 4/2011 | Matsuo et al. |
| 7,923,407 B2 | 4/2011 | Goto |
| 7,950,226 B2 | 5/2011 | McCarthy, Jr. et al. |
| 7,951,338 B2 | 5/2011 | Miyairi et al. |
| 7,976,804 B2 | 7/2011 | Jantsch et al. |
| 7,977,276 B2 | 7/2011 | Kikuchi et al. |
| 7,988,921 B2 | 8/2011 | Murata et al. |
| 7,998,896 B2 | 8/2011 | Kitamura et al. |
| 8,006,484 B2 | 8/2011 | Dalla Betta et al. |
| 8,007,750 B2 * | 8/2011 | Chen et al. ............... 423/239.1 |
| 8,038,951 B2 * | 10/2011 | Wassermann ......... B01J 21/066 422/168 |
| 8,071,502 B2 * | 12/2011 | Shimizu ............... B01D 53/945 502/303 |
| 8,211,392 B2 * | 7/2012 | Grubert ............... B01D 53/944 423/213.2 |
| 8,252,258 B2 * | 8/2012 | Muller-Stach ....... B01D 53/944 423/213.2 |
| 8,455,391 B2 | 6/2013 | Hanaki et al. |
| 8,546,296 B2 * | 10/2013 | Yabuzaki et al. ............... 502/332 |
| 8,551,908 B2 * | 10/2013 | Satou ............... B01D 53/945 502/262 |
| 8,568,675 B2 * | 10/2013 | Deeba et al. ............... 423/213.5 |
| 8,617,496 B2 * | 12/2013 | Wei et al. ............... 423/213.2 |
| 8,637,426 B2 * | 1/2014 | Hoke ............... B01D 53/945 502/333 |
| 8,734,743 B2 * | 5/2014 | Muller-Stach ....... B01D 53/945 422/170 |
| 8,828,343 B2 * | 9/2014 | Liu et al. ............... 423/213.5 |
| 8,833,064 B2 * | 9/2014 | Galligan et al. ............... 60/299 |
| 8,906,330 B2 * | 12/2014 | Hilgendorff et al. ...... 423/213.5 |
| 8,950,174 B2 * | 2/2015 | Hilgendorff ......... B01D 53/945 423/213.2 |
| 8,975,204 B2 * | 3/2015 | Hori ............... B01D 53/945 502/302 |
| 2003/0061860 A1 * | 4/2003 | Hu et al. ............... 73/23.31 |
| 2005/0081443 A1 | 4/2005 | Aiello et al. |
| 2005/0129588 A1 | 6/2005 | Nunan |
| 2005/0164879 A1 * | 7/2005 | Chen ............... 502/328 |
| 2005/0181940 A1 | 8/2005 | Wang et al. |
| 2006/0270549 A1 | 11/2006 | Sato et al. |
| 2007/0012028 A1 * | 1/2007 | Weissman et al. ............... 60/275 |
| 2007/0089403 A1 | 4/2007 | Pfeifer et al. |
| 2008/0045404 A1 * | 2/2008 | Han et al. ............... 502/66 |
| 2008/0075877 A1 | 3/2008 | He et al. |
| 2008/0287290 A1 | 11/2008 | Wang et al. |
| 2008/0307779 A1 | 12/2008 | El-Malki et al. |
| 2009/0022641 A1 | 1/2009 | Chen et al. |
| 2009/0099014 A1 | 4/2009 | Miura |
| 2009/0111688 A1 | 4/2009 | Nakamura et al. |
| 2009/0170689 A1 | 7/2009 | Hatanaka et al. |
| 2009/0175773 A1 * | 7/2009 | Chen et al. ............... 423/213.5 |
| 2009/0217745 A1 | 9/2009 | Schneider et al. |
| 2009/0246096 A1 | 10/2009 | Miwa et al. |
| 2009/0246097 A1 | 10/2009 | Fujita |
| 2009/0246456 A1 | 10/2009 | Ido et al. |
| 2009/0247402 A1 | 10/2009 | Ohno et al. |
| 2009/0247403 A1 | 10/2009 | Ido et al. |
| 2009/0255235 A1 | 10/2009 | Doring |
| 2009/0257933 A1 * | 10/2009 | Chen et al. ............... 423/213.2 |
| 2009/0275468 A1 | 11/2009 | Taki et al. |
| 2009/0285736 A1 | 11/2009 | Schafer-Sindlinger et al. |
| 2009/0297416 A1 | 12/2009 | Rohart et al. |
| 2009/0298673 A1 | 12/2009 | Akamine et al. |
| 2009/0318286 A1 | 12/2009 | Nagata et al. |
| 2010/0048383 A1 | 2/2010 | Lu et al. |
| 2010/0061903 A1 | 3/2010 | Kohara et al. |
| 2010/0126154 A1 | 5/2010 | Klingmann et al. |
| 2010/0150792 A1 | 6/2010 | Kitamura et al. |
| 2010/0207069 A1 | 8/2010 | Fujie et al. |
| 2010/0209326 A1 | 8/2010 | Gandhi et al. |
| 2010/0223919 A1 | 9/2010 | Lee et al. |
| 2010/0224142 A1 | 9/2010 | Iawmoto et al. |
| 2010/0229533 A1 | 9/2010 | Li et al. |
| 2010/0233051 A1 | 9/2010 | Grisstede et al. |
| 2010/0239468 A1 | 9/2010 | Mitani et al. |
| 2010/0263357 A1 | 10/2010 | Lindner et al. |
| 2010/0275579 A1 | 11/2010 | Klingmann et al. |
| 2010/0275581 A1 | 11/2010 | Wada et al. |
| 2010/0275584 A1 | 11/2010 | Wada et al. |
| 2010/0282189 A1 | 11/2010 | Ishimaru et al. |
| 2010/0287917 A1 | 11/2010 | Wada et al. |
| 2010/0298131 A1 | 11/2010 | Ni et al. |
| 2011/0003682 A1 | 1/2011 | Jen et al. |
| 2011/0005211 A1 | 1/2011 | Tissler et al. |
| 2011/0011068 A1 | 1/2011 | Ren et al. |
| 2011/0034331 A1 | 2/2011 | Kikuchi et al. |
| 2011/0041486 A1 | 2/2011 | Kato et al. |
| 2011/0047975 A1 | 3/2011 | Nakayama et al. |
| 2011/0047983 A1 | 3/2011 | Lee et al. |
| 2011/0047988 A1 | 3/2011 | Lewis |
| 2011/0071019 A1 | 3/2011 | Hanaki et al. |
| 2011/0099987 A1 | 5/2011 | Satou et al. |
| 2011/0107745 A1 | 5/2011 | Mori et al. |
| 2011/0107751 A1 | 5/2011 | Akamine et al. |
| 2011/0113754 A1 | 5/2011 | Kohara et al. |
| 2011/0126527 A1 | 6/2011 | Hilgendorff |
| 2011/0146251 A1 | 6/2011 | Bergeal et al. |
| 2011/0165045 A1 | 7/2011 | Ikeda et al. |
| 2011/0217215 A1 | 9/2011 | Vakkilainen et al. |
| 2011/0229392 A1 | 9/2011 | Frantz et al. |
| 2011/0271658 A1 | 11/2011 | Hoyer et al. |
| 2011/0274603 A1 | 11/2011 | Kohara et al. |
| 2012/0128557 A1 | 5/2012 | Nunan et al. |
| 2012/0180464 A1 | 7/2012 | Wei et al. |
| 2014/0171301 A1 | 6/2014 | Lim et al. |
| 2014/0274676 A1 * | 9/2014 | Liu et al. ............... 502/304 |

FOREIGN PATENT DOCUMENTS

| | | |
|---|---|---|
| EP | 0665047 | 8/1995 |
| EP | 1541220 | 6/2005 |
| EP | 1704910 | 9/2006 |
| EP | 1843017 | 10/2007 |
| EP | 1844843 | 10/2007 |
| EP | 1854538 | 11/2007 |
| EP | 1932590 | 6/2008 |
| EP | 1941954 | 7/2008 |

(56) References Cited

FOREIGN PATENT DOCUMENTS

| | | |
|---|---|---|
| EP | 1985354 | 10/2008 |
| EP | 1994982 | 11/2008 |
| EP | 2223735 | 9/2010 |
| EP | 2335811 | 6/2011 |
| KR | 10-20030095675 | 6/2005 |
| WO | WO-00/67883 | 11/2000 |
| WO | WO-2004/094793 | 11/2004 |
| WO | WO-2006/021336 | 3/2006 |
| WO | WO 2010/002486 | 1/2010 |
| WO | WO-2010/097146 | 9/2010 |
| WO | WO-2011/028466 | 3/2011 |
| WO | WO-2011/092517 | 8/2011 |
| WO | WO-2011/092519 | 8/2011 |
| WO | WO-2011/092521 | 8/2011 |
| WO | WO-2011/092523 | 8/2011 |
| WO | WO-2011/092525 | 8/2011 |

OTHER PUBLICATIONS

Ball, Douglas et al., FlexMetal Catalyst Technologies, *SAE Technical Paper Series* No. 2005-01-1111 2005, 15 pages.

\* cited by examiner

| Pd/OSC + Rh/Alu, OSC ≥ Al |

Single Slurry – Two-Metal Layer
Thermally-Fixed PM

FIG. 1

| Rh/Alumina, OSC, Al > OSC |
| Pd/OSC + Rh/Alu, OSC ≥ Al |

FIG. 2

| Rh/Alumina, Pd/OSC, Al > OSC |
| Pd/OSC + Rh/Alu, OSC ≥ Al |

FIG. 3

| Rh/Alumina, Pd/Low-Ceria OSC |
| Pd/OSC + Rh/Alu, OSC ≥ Al |

FIG. 4

AUTOMOTIVE CATALYST COMPOSITES HAVING A TWO-METAL LAYER

CROSS-REFERENCE TO RELATED APPLICATIONS

This application claims priority under 35 U.S.C. §119(e) to U.S. Patent Application Ser. No. 61/756,139, filed Jan. 24, 2013, which is incorporated herein by reference in its entirety.

TECHNICAL FIELD

This invention pertains generally to automotive catalysts having a two-metal layer and composites and emission treatment systems using such catalysts to treat exhaust streams of gasoline engines containing hydrocarbons, carbon monoxide, and oxides of nitrogen. More specifically, this invention is directed to three-way conversion (TWC) catalysts having both rhodium and palladium in the same layer and composites coated onto substrates such as a monolithic carrier.

BACKGROUND

Emission standards for unburned hydrocarbons, carbon monoxide and nitrogen oxide contaminants continue to become more stringent. In order to meet such standards, catalytic converters containing a three-way conversion (TWC) catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Many TWC catalysts are manufactured with at least two separate catalyst coating compositions (washcoats) that are applied in the form of aqueous dispersions as successive layers on a substrate (for example, a honeycomb body composed of ceramic or metal) in order to separate noble metals, such as, palladium and rhodium which represent the main catalytically active species. Separation has been necessary historically because palladium and rhodium can form an alloy which is known to be less catalytically active.

TWC catalysts incorporate oxygen storage components (OSC) and alumina materials to support the precious metals. In such TWC catalysts, the activity of Rh can be hindered by interaction with alumina and cerium oxide contained in the OSC composite material. Such interaction can lead to a deactivation of Rh catalytic activity especially when the concentration of the cerium oxide in the OSC composite material exceeds 30 weight %. Furthermore, Rh migrates within the washcoat upon high-temperature aging, i.e. temperature higher than 1000° C. The Rh migration affects negatively the emission performance, in particular the NOx conversion under rich conditions, since Rh would then be in contact with the cerium oxide in the OSC composite material. Rhodium performance can also be hindered by interactions with palladium.

There is a need to provide single washcoat compositions containing both palladium and rhodium while maintaining and/or improving catalytic performance as compared to compositions that provide these metals individually for separate layers. There is also a need for applying the single washcoat composition in one coating step. There is also continuing need to provide a TWC catalyst composites that utilize precious metals efficiently and remain effective to meet regulated HC, NOx, and CO conversions. There is a further need to limit Rh deactivation due to interaction with OSC and to limit the migration of Rh supported materials thus ensuring improved conversion efficiency.

SUMMARY

Provided are automotive catalyst composites having a two-metal layer on a carrier, and methods of making and using these catalyst composites.

In a first aspect, provided are automotive catalyst composites comprising: a catalytic material on a carrier, the catalytic material comprising a two-metal layer that comprises: a rhodium component supported by a first support comprising a refractory metal oxide component or a first ceria-zirconia composite; a palladium component supported by a second support comprising a second ceria-zirconia composite; one or more of a promoter, stabilizer, or binder; wherein the catalytic material is effective for three-way conversion (TWC) to substantially simultaneously oxidize carbon monoxide and hydrocarbons and reduce nitrogen oxides, and wherein the amount of the total of the first and second ceria-zirconia composites in the two-metal layer is equal to or greater than the amount of the refractory metal oxide component.

In one or more embodiments, the palladium component, the rhodium component, or both are thermally-fixed.

One or more embodiments provide that the first support for the rhodium component comprises an alumina-based support or a zirconium-based support. In a detailed embodiment, the first support for the rhodium component comprises an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria.

In other embodiments, the first support for the rhodium component comprises a ceria-zirconia composite comprising 20% or less by weight of ceria.

The second support for the palladium component can comprise a ceria-zirconia composite comprising at least 25% by weight of ceria.

In one or more embodiments, a weight ratio of the amount of the total of the first and second ceria-zirconia composites to the amount of the refractory metal oxide component in the two-metal layer is greater than 1:1; or 2.5:1 or greater; or 4:1 or greater; or even 5:1 or greater.

A further a palladium component on a refractory metal oxide component can be added as desired.

One embodiment provides that the two-metal layer comprises, by weight percent of the two-metal layer: the second ceria-zirconia composite in an amount in the range of 40-50%; the refractory metal oxide component in an amount in the range of 40-50%; and one or more of lanthana, baria, zirconia, and strontium in an amount of up to 10%; wherein the second ceria-zirconia composite comprises ceria in an amount in the range of 25-45% by weight of the second ceria-zirconia composite.

In another embodiment, the two-metal layer comprises, by weight percent of the two-metal layer: the second ceria-zirconia composite in an amount in the range of 70-80%; the refractory metal oxide component in an amount in the range of 10-20%; and one or more of lanthana, baria, zirconia, and strontium in an amount of up to 10%; wherein the second ceria-zirconia composite comprises ceria in an amount in the range of 25-45% by weight of the second ceria-zirconia composite. In a detailed embodiment, the refractory metal oxide component comprises an alumina-ceria compound.

The catalytic material can further comprise a second layer over the two-metal layer, the second layer comprising a rhodium component on a third support, a platinum component on a fourth support, a palladium component on a fifth support, or combinations thereof. In one or more embodiments, the second layer comprises the rhodium component on the third support that comprises an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. An OSC material can be added to the second layer to enhance conversion performance.

In one or more embodiments, the second layer can comprise the palladium component on the fifth support that comprises a third ceria-zirconia composite. In a detailed embodiment, the third ceria-zirconia support comprises ceria in an amount in the range of 5-20% by weight of the third ceria-zirconia composite.

In an embodiment, the second layer comprises: a rhodium component on an activated alumina component selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria; and a palladium component on a third ceria-zirconia composite comprising ceria in an amount in the range of 5-20% by weight of the third ceria-zirconia composite.

A detailed aspect provides an automotive catalyst composite comprising: a catalytic material on a carrier, the catalytic material comprising a two-metal layer that comprises: a rhodium component supported by an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria; a palladium component thermally-fixed to a ceria-zirconia composite that comprises ceria in an amount in the range of 25-45% by weight of the ceria-zirconia composite; one or more of lanthana, baria, and zirconia; wherein the catalytic material is effective for three-way conversion (TWC) to substantially simultaneously oxidize carbon monoxide and hydrocarbons and reduce nitrogen oxides, and wherein a weight ratio of the amount of the ceria-zirconia composite to the amount of the activated alumina compound in the two-metal layer is 4:1 or greater. The activated alumina compound can specifically comprise an alumina-ceria compound.

The composites provided herein can further comprise a second layer over the two-metal layer, the second layer comprising: a rhodium component supported by an activated alumina compound. The second layer can further comprise an OSC material. The second layer can further comprise a palladium component on a ceria-zirconia composite. In a detailed embodiment, the ceria-zirconia composite comprises ceria in an amount in the range of 5-20% by weight of the ceria-zirconia composite. In one or more embodiments, the amount of the rhodium component in the second layer is approximately the same as the amount of the rhodium component in the two-metal layer.

Another aspect provides an exhaust gas treatment system comprising the catalyst composites disclosed herein located downstream of a gasoline engine. The exhaust gas treatment system can further comprise a close-coupled three-way conversion (TWC) catalyst composite downstream of the gasoline engine, wherein the catalyst composite of claim 1 is located downstream of the close-coupled TWC catalyst composite and upstream of a NOx abatement catalyst. NOx abatement catalysts include, but are not limited to, lean NOx traps and Selective Catalytic Reduction (SCR) catalysts.

Other aspects provide methods for treating an exhaust gas comprising hydrocarbons, carbon monoxide, and nitrogen oxides comprising: contacting the exhaust gas with the catalyst composites disclosed herein.

Another aspect is a method of making a catalyst composite comprising: forming a three-way conversion (TWC) catalytic material by: dispersing a rhodium component onto a first support comprising a refractory metal oxide component or a first ceria-zirconia composite to form a first impregnated support; optionally, fixing the rhodium component to the first impregnated support; dispersing a palladium component onto a second support comprising a second ceria-zirconia composite to form a second impregnated support; optionally, fixing the palladium component to the second impregnated support; thereafter forming an aqueous washcoat dispersion by mixing water, the first and second impregnated supports, and one or more of a promoter, stabilizer, or binder; coating the aqueous washcoat dispersion onto a carrier to form a two-metal single layer on the carrier; calcining the two-metal layer to form the catalyst composite; wherein the catalytic material is effective for three-way conversion (TWC) to substantially simultaneously oxidize carbon monoxide and hydrocarbons and reduce nitrogen oxides, and wherein the amount of the total of the first and second ceria-zirconia composites is equal to or greater than the amount of the refractory metal oxide component in the two-metal layer. In one or more embodiments, the palladium component, the rhodium component, or both are thermally-fixed. Other embodiments provide well-dispersing the rhodium component onto the first support and well-dispersing the palladium component onto the second support. The methods can further comprise coating a second layer onto the two-metal layer, the second layer comprising a rhodium component on a third support comprising an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria and optionally a platinum component on a fourth support, a palladium component on a fifth support, or both.

BRIEF DESCRIPTION OF DRAWINGS

FIG. 1 is a schematic of a representative catalytic material according to an embodiment;

FIG. 2 is a schematic of a representative catalytic material according to an embodiment;

FIG. 3 is a schematic of a representative catalytic material according to an embodiment; and FIG. 4 is a schematic of a representative catalytic material according to an embodiment.

DETAILED DESCRIPTION

Provided are automotive catalyst composites having a two-metal layer on a carrier, and methods of making and using these catalyst composites. The two-metal layer is formed from a single washcoat layer that contains two precious metals, each of which is on its own support, resulting in a homogeneous mixture of the two metals in the same layer on a carrier. The two-metal washcoat/layer is designed to contain an activated alumina component and/or a ceria-zirconia composite for supporting rhodium and another ceria-zirconia composite for supporting palladium. A feature of this washcoat/layer is that the total weight of the ceria-zirconia composites is equal to or greater than the amount of the activated alumina component. Higher amounts of ceria can therefore be delivered than prior art multi-layered composites where palladium and rhodium were provided in separate layers, requiring higher amounts of an activated alumina component for suitable distribution and binding. When rhodium is supported by an activated alumina component, typically all of the desired alumina for the catalytic material is used to receive the rhodium component.

One or more of the precious metals are fixed to their individual support, which means that the precious component is not soluble in the washcoat dispersion. Fixing of precious metals can occur by chemical or thermal fixation. For thermal fixing, to produce a "thermally-fixed" precious metal, it is meant that the impregnated supports are treated with heat such that the precious metals are converted to their oxide forms and that upon use of the thermally-fixed precious metals on supports in an aqueous slurry, the precious metals are not soluble and do not alloy/agglomerate. For chemical fixation, the pH or some other parameter of the dispersion of the precious metal salt with support is changed to render the precious metal component insoluble in the washcoat dispersion. Without intending to be bound by theory, it is thought that the thermally-fixed precious metals contained in the homogeneously mixed two-metal layer minimize migration of the precious metals, especially the rhodium.

The catalysts composites provided herein can deliver the same if not better performance of comparable multi-layered composites of the identical overall composition where there is only one precious metal per layer.

Another optional feature of this design is that the precious meal components are well-dispersed on their respective supports prior to thermal-fixing. Reference to "well-dispersed" means that precious or noble metals are dispersed in an even and unagglomerated matter throughout the pore volume of a given support. In this way, the amount support material is in contact with the precious metal is maximized. One way to achieve this is to impregnate the precious metal onto the support by use of the lowest concentration of aqueous solution to achieve desired precious metal loading while achieving incipient wetness to maximize how much support material is in contact with the precious metal. One measure of dispersion is carbon monoxide (CO) chemisorption. The higher the dispersion number, the better the dispersion. Another measure of good dispersion is minimal agglomeration shown by active particle size.

Reference to "oxygen storage component" (OSC) refers to an entity that has multi-valence state and can actively react with oxidants such as oxygen or nitrous oxides under oxidative conditions, or reacts with reductants such as carbon monoxide (CO) or hydrogen under reduction conditions. Typically, the OSC will comprise one or more reducible oxides of one or more rare earth metals. Examples of suitable oxygen storage components include ceria, praseodymia, or combinations thereof. Delivery of ceria into the layer can be achieved by the use of, for example, ceria, a mixed oxide of cerium and zirconium, and/or a mixed oxide of cerium, zirconium, yttrium, lanthanum, optionally neodymium.

Reference to a "support" in a catalyst washcoat layer refers to a material that receives precious metals, stabilizers, promoters, binders, and the like through association, dispersion, impregnation, or other suitable methods. Examples of supports include, but are not limited to, high surface area refractory metal oxides and composites containing oxygen storage components. Exemplary support materials are high surface area aluminum oxide (>80, 90, 100, 125, or even 150 $m^2$/g) (in various modifications), zirconium oxide components that can be combined with stabilizers such as lanthana (i.e., Zr—La composites), and oxygen storage components (i.e. cerium-zirconium mixed oxides in various embodiments).

Exemplary high surface area refractory metal oxides can comprise an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria.

There is a substantial challenge of combining two individual noble metals in one coating composition due to the solubility of precious metal salts in water. In conventional TWC catalysts, the noble metals palladium and rhodium are individually applied by impregnation as nitrate solutions (Pd$(NO_3)_2$ and Rh$(NO_3)_3$) to the support materials and are then subsequently incorporated into an aqueous washcoat dispersion. Specifically, prior art methods included:

a. Application of a first noble metal by impregnation with a metal salt solution without regard to dilution to a first support (aluminum oxide or OSC) to form a first impregnated support;

b. Production of a first aqueous washcoat dispersion using the first impregnated support;

c. Application of a second noble metal by impregnation with a metal salt solution without regard to dilution to a second support (aluminum oxide or OSC) to form a second impregnated support;

d. Production of a second aqueous washcoat dispersion using the first impregnated support;

e. Application of a first layer onto carrier using the first aqueous washcoat dispersion and calcination of the first layer;

f. Application of a second layer onto carrier using the second aqueous washcoat dispersion and calcinations of the second layer.

If both noble metals were to be processed in a single aqueous washcoat dispersion utilizing conventional methods, the probability of the two noble metals forming an alloy within the washcoat layer as a result of the use of water-soluble metal salts would be greatly increased. This would lead to the performance of the TWC catalyst being poorer in this case than in the case of separate palladium and rhodium layers.

To address the problem of solubilizing metals salts in an aqueous washcoat after impregnation of the metals onto their respective supports, disclosed herein are methods to thermally fix the noble metals on the support materials and to form a two-metal layer. As a result, these noble metals do not go back into solution due to their conversion to their oxide forms and are not present in dissolved form in the aqueous phase of the washcoat dispersion. In addition, prior to thermally-fixing the noble metals, they can be well-dispersed on the support surfaces, as desired.

In general, the methods herein relate to preparation of individual metal compositions that are thermally-fixed and optionally well-dispersed. As such, individual noble metals, such as palladium and rhodium, are applied as nitrate solutions by impregnation to separate support materials to achieve good dispersion. That is, the nitrate solutions are diluted to the highest possible amount while delivering the desired metal loading. The individual diluted nitrate solutions are then added to the individual support materials by incipient wetness to form impregnated supports. The impregnated supports are then, in contrast to the conventional method, subsequently fired (thermally-fixed) before the aqueous washcoat dispersion is produced. Firing of the impregnated support materials leads to conversion of the palladium nitrate and rhodium nitrate into the corresponding oxides. Without intending to be bound by theory, it is thought that the oxides are insoluble in water, which helps to prevent palladium and rhodium from redissolving. The probability of palladium-rhodium alloy formation is thus decreased, although the two noble metals are present in the same washcoat layer. Methods of the current invention can include, in general terms, for production of washcoat compositions for single coating:

a. Application of a first noble metal by impregnation with a metal salt solution that optionally has been diluted to minimize metal concentration while delivering desired amount to a first support (aluminum oxide or OSC) to form a first well-dispersed impregnated support;

b. Thermal fixing (firing of the impregnated support at 590° C.) the first impregnated support;

c. Application of a second noble metal by impregnation with a metal salt solution that optionally has been diluted to minimize metal concentration while delivering desired amount to a second support (aluminum oxide or OSC) to form a second well-dispersed impregnated support;

d. Thermal fixing (firing of the impregnated support at 590° C.) the second impregnated support;

e. Production of a single aqueous washcoat dispersion using the well-dispersed and thermally-fixed impregnated supports;

f. Application of a two-metal layer onto carrier using the single aqueous washcoat dispersion and calcination of the single layer.

In principle, the production of the aqueous TWC washcoat dispersions b.) and d.) of the prior art method does not differ from the production of the aqueous washcoat dispersion e.) for single coating, i.e. production of the dispersions is carried out in an acidic pH range of 2-6 (typically: 3.5-5.0) and any additional desired ingredients such as promoters and stabilizers are added in this step or during the impregnation step prior to calcining. A representative two-metal catalytic material is shown in FIG. 1, where palladium is supported by a ceria-zirconia and rhodium is supported by an alumina.

In a further aspect, TWC catalyst formulations have been developed that incorporate two layers of different compositions. That is, the second layer is provided by an washcoat that is different from that of the two-metal layer. The concept of this catalyst architecture is substantially equal distribution of Rh between bottom and top layer to limit Rh migration and at the same time to provide an optimized Rh environment in the topcoat. The first layer has an OSC/Alumina ratio that is greater than 1:1 (or at least 2.5/1 or at least 4/1 or even at least 5/1) and contains both the total amount of Pd available and only the half of the Rh available impregnated on alumina. The second layer has a lower OSC/alumina ratio (that is there is more alumina than OSC material). The cerium oxide concentration in the OSC material can be low at approximately 10 wt. % or even 5 to 20 wt. %. In this second layer, Rh is impregnated on the alumina. The choice of ceria content in the OSC material can be application-specific. An exemplary catalytic material is provided in FIG. 2, where the bottom layer is a two-metal layer and the top layer contains rhodium on alumina and an OSC material, where in the second layer, the alumina content is greater than the OSC material content. It may be desirable to provide palladium on the OSC material of the second layer, as shown in FIG. 3. In addition, it may be desirable to have Rh/alumina and low ceria containing OSC material in the second layer to have good engine performance and good rich NOx conversion activity, which provides better conversion results as compared to a standard formulation with Rh in the top coat and Pd in the bottom coat or respective single slurry formulations with Pd and Rh in only one coat.

Another design concept is to use the above described formulation with Pd/Rh bottom coat, Rh impregnated to the alumina, and Pd impregnated to the OSC material. The top coat in this concept can comprise Rh impregnated on the alumina and Pd (30 wt. % of the total amount used in the formulation) impregnated on OSC material with about 10 wt. % cerium oxide concentration. The Pd in the top layer will improve HC conversion compared to the standard formulation. This embodiment is depicted in FIG. 4.

As such, in one or more embodiments, the second layer can contain one precious metal, typically rhodium; two metals, typically rhodium and palladium or palladium and platinum; or even up to three metals: rhodium, palladium, and platinum. The composition of the second layer typically includes a rhodium component on a support such as an activated alumina component selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Optionally, a ceria zirconia composite can be provided in the second layer to facilitate overall performance of the catalytic material. In one or more embodiments, the ceria-zirconia composite is a low-ceria OSC component having a ceria content of 5-20% by weight. In other embodiments, the ceria content of the OSC component can be 20-45% by weight. As desired, the second layer can comprise a palladium and/or a platinum component each of which is thermally-fixed on its own support to facilitate further conversion of emissions such as HC. A suitable support for platinum can be an activated alumina component and for palladium can be a ceria-zirconia composite having a low ceria content. The washcoat for the second layer can be prepared according to methods known in the art. With respect to fixing the metals, chemical or thermal fixation can be used as desired.

With the use of a second layer on top of the two-metal layer provides, rhodium can be substantially equally distributed between the two layers to limit Rh migration and to provide the Rh with two different environments to facilitate conversion.

The choice of the support material (OSC or aluminum oxide) for the two noble metals palladium and rhodium impact performance of the TWC catalyst composites. The preferred supports for palladium are cerium-containing composites, such as ceria-zirconia composites which have a high proportion of ceria (ceria>25% by weight, for example, in the range of 25-45% by weight of the composite). Preferred supports for rhodium are aluminum oxide and cerium-containing composites, such as ceria-zirconia composites, which have a low proportion of ceria (<40%, or <30%, or <20%, or even <10% by weight of the composite). It is also possible to process mixtures; for example, part of the rhodium is applied by impregnation to the preferred OSC composite and a further proportion is applied by impregnation to the aluminum oxide. In addition, part of the palladium can also be applied by impregnation to the aluminum oxide.

Comparison of the performance of well-dispersed, thermally-fixed two-metal layer TWC catalyst composites having the same composition shows that the application of all of the palladium to the aluminum oxide and application of all of the rhodium to the OSC composite gives considerably poorer performance than when all of the rhodium is supported by the aluminum oxide and all of the palladium is supported on an OSC composite.

In the context of TWC catalyst composites produced in the absence of thermal fixing, deliberate and specific placement of the noble metals on the support materials aluminum oxide and OSC does not impact performance in the same way as in the context of thermal fixing. In the absence of thermal fixing, some of the noble metals go back into solution during production of the washcoat dispersion, and inevitably redistribution of the noble metals takes place, so that typically both support materials end up bearing both noble metals. This inevitable redistribution does not occur in the case of thermal fixing. For this reason, the choice of type and amount of the support materials impacts the performance of the TWC catalyst composite when thermal fixing is used as in the case of the two-metal coating composition With respect to well-dispersed noble metals, distribution of the noble metal on the support materials is impacted by the concentration of the noble metal in the impregnation solution. The maximum amount of impregnation solution that can be applied is just above "incipient wetness", so that the impregnated powder is still dry and flowable. The mass of noble metal applied to the support is determined by a desired total noble metal loading of the TWC catalyst composite. Well-dispersed metals are achieved at lowest possible concentration of the noble metal in the impregnation solution is selected.

In addition, the thermal fixing of the noble metals palladium and rhodium results in virtual elimination of a need to make manual adjustments to the aqueous washcoat dispersion. In contrast, when support compositions are not thermally-fixed, manual intervention in the process is frequently required in order to set, for example, pH values. This leads to dilution of the washcoat and lowering of solids content. As such, with the prior art methods, high solids contents are difficult to achieve, which in turn inhibits high coating weights from being applied in one coating step. Manual adjustments of, for example, the pH is reduced and virtually eliminated when thermally-fixed support compositions are used. This is another reason that permits a high solids content of the washcoat dispersion.

A further aspect which is considered to be an additional advantage of well-dispersed and thermally-fixed two-metal coating is a reduction in the noble metal variations on the finished catalyst. By conducting only a single coating step and increasing the mass that can be applied in one coating step will lead to a reduction in the noble metal variations in the coating process. This means that the accuracy of the amount of noble metal to be applied to the catalyst will become greater when the TWC single coating concept is employed.

The Components

TWC catalysts that exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. The refractory metal oxide supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 (Keith). TWC catalysts can be formulated to include an oxygen storage component (OSC) including, for example, ceria and praseodymia.

High surface refractory metal oxide supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption.

The catalytic layer may also contain stabilizers and promoters, as desired. Suitable stabilizers include one or more non-reducible metal oxides wherein the metal is selected from the group consisting of barium, calcium, magnesium, strontium and mixtures thereof. Preferably, the stabilizer comprises one or more oxides of barium and/or strontium. Suitable promoters include one or more non-reducible oxides of one or more rare earth metals selected from the group consisting of lanthanum, praseodymium, yttrium, zirconium and mixtures thereof.

The Carrier

In one or more embodiments, one or more catalyst compositions are disposed on a carrier. The carrier may be any of those materials typically used for preparing catalysts, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The carrier can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter carrier can be made from materials commonly known in the art, such as cordierite or silicon carbide.

The ceramic carrier may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The carriers useful for the catalysts of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In alternative embodiments, one or more catalyst compositions may be deposited on an open cell foam substrate. Such substrates are well known in the art, and are typically formed of refractory ceramic or metallic materials.

Embodiments

One aspect is directed to automotive catalyst composite comprising a catalytic material on a carrier, the catalytic material comprising a two-metal layer. Another aspect is directed to automotive catalyst composite comprising a catalytic material on a carrier, the catalytic material comprising a two-metal layer on the carrier and a second layer on top of the two-metal layer. Another aspect provided is making a single slurry to provide a two-metal layer. Another aspect is treating an exhaust system with catalyst composites provided herein. Various embodiments are listed below. It will be understood that the embodiments listed below may be combined with all aspects and other embodiments in accordance with the scope of the invention.

In embodiment one, the catalytic material comprises: a rhodium component supported by a first support comprising a refractory metal oxide component or a first ceria-zirconia composite; a palladium component supported by a second support comprising a second ceria-zirconia composite; one or more of a promoter, stabilizer, or binder; wherein the catalytic material is effective for three-way conversion (TWC) to substantially simultaneously oxidize carbon monoxide and hydrocarbons and reduce nitrogen oxides, and wherein the amount of the total of the first and second ceria-zirconia composites in the two-metal layer is equal to or greater than the amount of the refractory metal oxide component.

In embodiment two, the palladium component, the rhodium component, or both are thermally-fixed. In embodiment three, the rhodium component is well-dispersed onto the first support and/or the palladium component is well-dispersed onto the second support.

In embodiment four, the first support for the rhodium component comprises an alumina-based support or a zirconium-based support.

In embodiment five, the first support for the rhodium component comprises an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria.

In embodiment six, the first support for the rhodium component comprises a ceria-zirconia composite comprising 20% or less by weight of ceria.

In embodiment seven, the second support for the palladium component comprises a ceria-zirconia.

In embodiment eight, the second support for the palladium component comprises composite comprising at least 25% by weight of ceria.

In embodiment nine, a weight ratio of the amount of the total of the first and second ceria-zirconia composites to the amount of the refractory metal oxide component in the two-metal layer is greater than 1:1.

In embodiment ten, the weight ratio is 2.5:1 or greater.

In embodiment eleven, the weight ratio is 4:1 or greater.

In embodiment twelve, the catalytic material further comprises a palladium component on a refractory metal oxide component.

In embodiment thirteen, the two-metal layer comprises, by weight percent of the two-metal layer: the second ceria-zirconia composite in an amount in the range of 40-50%; the refractory metal oxide component in an amount in the range of 40-50%; and one or more of lanthana, baria, zirconia, and strontium in an amount of up to 10%; wherein the second ceria-zirconia composite comprises ceria in an amount in the range of 25-45% by weight of the second ceria-zirconia composite.

In embodiment fourteen, the two-metal layer comprises, by weight percent of the two-metal layer: the second ceria-zirconia composite in an amount in the range of 70-80%; the refractory metal oxide component in an amount in the range of 10-20%; and one or more of lanthana, baria, zirconia, and strontium in an amount of up to 10%; wherein the second ceria-zirconia composite comprises ceria in an amount in the range of 25-45% by weight of the second ceria-zirconia composite.

In embodiment fifteen, the refractory metal oxide component comprises an alumina-ceria compound.

In embodiment sixteen, the catalytic material further comprises a second layer over the two-metal layer, the second layer comprising a rhodium component on a third support, a platinum component on a fourth support, a palladium component on a fifth support, or combinations thereof.

In embodiment seventeen, the second layer comprises the rhodium component on the third support that comprises an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria.

In embodiment eighteen, the second layer comprises the palladium component on the fifth support that comprises a third ceria-zirconia composite.

In embodiment nineteen, the third ceria-zirconia composite comprises ceria in an amount in the range of 5-20% by weight of the third ceria-zirconia composite.

In embodiment twenty, the second layer comprises a rhodium component supported by an activated alumina compound; and a ceria zirconia composite.

In embodiment twenty-one, the amount of the rhodium component in the second layer is approximately the same as the amount of the rhodium component in the two-metal layer.

In embodiment twenty-two, the catalyst composites disclosed herein are located downstream of a gasoline engine.

In embodiment twenty-three, the catalysts composites disclosed herein are located downstream of a close-coupled three-way conversion (TWC) catalyst composite that is downstream of the gasoline engine and upstream of a NOx abatement catalyst.

In embodiment twenty-four, an exhaust gas stream contacts any of the catalyst composites disclosed herein for treatment.

In embodiment twenty-five, a method of making a catalyst composite comprises: forming a three-way conversion (TWC) catalytic material by: dispersing a rhodium component onto a first support comprising a refractory metal oxide component or a first ceria-zirconia composite to form a first impregnated support; optionally, fixing the rhodium component to the first impregnated support; dispersing a palladium component onto a second support comprising a second ceria-zirconia composite to form a second impregnated support; optionally, fixing the palladium component to the second impregnated support; thereafter forming an aqueous washcoat dispersion by mixing water, the first and second impregnated supports, and one or more of a promoter, stabilizer, or binder; coating the aqueous washcoat dispersion onto a carrier to form a two-metal single layer on the carrier; calcining the two-metal layer to form the catalyst composite; wherein the catalytic material is effective for three-way conversion (TWC) to substantially simultaneously oxidize carbon monoxide and hydrocarbons and reduce nitrogen oxides, and wherein the amount of the total of the first and second ceria-zirconia composites is equal to or greater than the amount of the refractory metal oxide component in the two-metal layer.

EXAMPLES

The following non-limiting examples shall serve to illustrate the various embodiments of the present invention.

Example 1

Thermally-fixed impregnated support compositions were prepared as follows. A Rh or Pd nitrate solution was impregnated onto a chosen support material by using a solution of minimal concentration of metal to deliver a desired meal loading to result in a well-dispersed impregnated support. The well-dispersed impregnated supports were then fired at 590° C. for two hours to produce well-dispersed and thermally fixed impregnated supports. These materials were then tested for CO chemisorption to provide a metal dispersion percentage, which is a measure of how much CO the precious metals could adsorb, directly impacted by the amount of metal and the support. Active particle size was calculated from CO absorption.

| Sample | Solids Content[1] wt % | PM Loading | Support Material | Metal Dispersion (%) | Active Particle Size (nm) |
|---|---|---|---|---|---|
| 1-A | 54 | 0.4 wt % Rh | 150 m²/g gamma-Al | 85.5 | 1.3 |
| 1-B | 67 | 0.4 wt % Rh | 150 m²/g gamma-Al | 81.8 | 1.3 |
| 1-C | 80 | 0.4 wt % Rh | 150 m²/g gamma-Al | 76.6 | 1.4 |
| 1-D | 54 | 1.47% Pd | 150 m²/g gamma-Al | 21.5 | 5.2 |
| 1-E | 67 | 1.47% Pd | 150 m²/g gamma-Al | 18.2 | 6.1 |
| 1-F | 80 | 1.47% Pd | 150 m²/g gamma-Al | 16.6 | 6.8 |
| 1-G | 67.5 | 0.4 wt % Rh | Ce—Zr composite (30% ceria) | 96.4 | 1.1 |
| 1-H | 73.75 | 0.4 wt % Rh | Ce—Zr composite (30% ceria) | 99.0 | 1.1 |
| 1-I | 80 | 0.4 wt % Rh | Ce—Zr composite (30% ceria) | 108.8 | 1.0 |
| 1-J | 67.5 | 1.47% Pd | Ce—Zr composite (30% ceria) | 24.3 | 4.6 |
| 1-K | 73.75 | 1.47% Pd | Ce—Zr composite (30% ceria) | 21.3 | 5.3 |
| 1-L | 80 | 1.47% Pd | Ce—Zr composite (30% ceria) | 21.4 | 5.2 |

[1]reference to solids content means: the amount of solids in the mixture after impregnation Looking to the data of Table 1, the samples with the lowest solids content (Samples 1-A, 1-D, and 1-J), that is, favoring good dispersion show the highest metal dispersion % and lowest particle size compared to the higher solids contents samples (Samples 1-B, 1-C, 1-E, 1-F, 1-K, 1-L), that is, less dilute.

Example 2

For preparation of a catalyst composite comprising a single layered catalyst having a two-metal layer, two impregnated supports were prepared. The first impregnated support was prepared by adding a rhodium nitrate solution diluted to minimize the metal concentration to 1.68 g/in$^3$ of high-surface area gamma-alumina resulting in 3 g/ft$^3$ Rh. The second impregnated support was prepared by adding a palladium nitrate solution diluted to minimize the metal concentration to 1.70 g/in$^3$ of a ceria-zirconia composite ($CeO_2$: 40 weight %) resulting in 47 g/ft$^3$ Pd. The two resulting impregnated powders were individually thermally-fixed at 590° C. and milled. A single aqueous washcoat was formed by dispersed the thermally-fixed impregnated supports in water and acid (e.g. acetic acid). Also, promoters of Ba and Zr were dispersed therein. The slurry was milled and coated onto a monolith at a loading of 3.66 g/in$^3$, dried at 110° C. in air and calcined at 590° C. in air.

Example 3

Comparative

A comparison two-layered catalyst composite was prepared having a palladium bottom layer and a rhodium top layer. Its overall composition of supports and precious metals was the same as that of Example 2. For the bottom layer, a palladium nitrate solution diluted to minimize the metal concentration was added to 0.43 g/in$^3$ of a high surface area gamma-alumina resulting in 47 g/ft$^3$ Pd. The resulting impregnated powder was dispersed in water and acid (e.g. acetic acid). Into this slurry 1.45 g/in$^3$ OSC material ($CeO_2$: 40 weight %) and promoters of Ba, Zr, and La were dispersed and milled. The final slurry was coated onto a monolith at a loading of 2.08 g/in$^3$ dried and 110° C. in air and calcined at 590° C. in air.

For the top layer, a Rh nitrate solution diluted to minimize the metal concentration was added to 1.25 g/in$^3$ of a high surface area gamma-alumina resulting in 3 g/ft$^3$ Rh. The resulting impregnated powder was dispersed in water and acid (e.g. acetic acid). Into this slurry 0.25 g/in$^3$ of OSC material ($CeO_2$: 40 weight %) and promoters of Ba and Zr were dispersed and milled. The final slurry was coated onto a monolith previously coated with the bottom layer at a loading of 1.60 g/in$^3$ dried and 110° C. in air and calcined at 590° C. in air.

Example 4

For preparation of a single-layered catalyst having a two-metal layer, two impregnated supports were prepared in accordance with the steps of Example 2. For Example 4, more ceria-zirconia support was used as compared to Example 2. The first impregnated support was prepared by adding a rhodium nitrate solution diluted to minimize the metal concentration to 0.43 g/in$^3$ of high-surface area gamma-alumina resulting in 3 g/ft$^3$ Rh. The second impregnated support was prepared by adding a palladium nitrate solution diluted to minimize the metal concentration to 1.70 g/in$^3$ of a ceria-zirconia composite (CeO$_2$: 30 weight %) resulting in 47 g/ft$^3$ Pd. The two resulting impregnated powders were individually thermally-fixed at 590° C. and milled. A single aqueous washcoat was formed by dispersed the thermally-fixed impregnated supports in water and acid (e.g. acetic acid). Also, promoters of La, Ba, and Zr were dispersed therein. The slurry was milled and coated onto a monolith at a loading of 2.98 g/in$^3$, dried at 110° C. in air and calcined at 590° C. in air.

Example 5

For preparation of a single-layered catalyst having a two-metal layer, two impregnated supports were prepared in accordance with the steps of Example 2. For Example 5, a different support for Rh was used as compared to Example 4. The first impregnated support was prepared by adding a rhodium nitrate solution diluted to minimize the metal concentration to 0.50 g/in$^3$ of high-surface area gamma-alumina-ceria resulting in 3 g/ft$^3$ Rh. The second impregnated support was prepared by adding a palladium nitrate solution diluted to minimize the metal concentration to 2.90 g/in$^3$ of a ceria-zirconia composite (CeO$_2$: 30 weight %) resulting in 47 g/ft$^3$ Pd. The two resulting impregnated powders were individually thermally-fixed at 590° C. and milled. A single aqueous washcoat was formed by dispersed the thermally-fixed impregnated supports in water and acid (e.g. acetic acid). Also, promoters of Ba and Zr were dispersed therein. The slurry was milled and coated onto a monolith at a loading of 3.64 g/in$^3$, dried at 110° C. in air and calcined at 590° C. in air.

Example 6

A two-layered catalyst composite having a two-metal layer in the bottom layer and a Pd—Rh top layer was prepared. Its overall composition of supports and precious metals was the same as that of Example 5. For the bottom layer, two impregnated supports were prepared in accordance with the steps of Example 2. The first impregnated support was prepared by adding a rhodium nitrate solution diluted to minimize the metal concentration to 0.43 g/in$^3$ of high-surface area gamma-alumina-ceria resulting in 1.5 g/ft$^3$ Rh. The second impregnated support was prepared by adding a palladium nitrate solution diluted to minimize the metal concentration to 2.25 g/in$^3$ of a ceria-zirconia composite (CeO$_2$: 30 weight %) resulting in 32.9 g/ft$^3$ Pd. The two resulting impregnated powders were individually thermally-fixed at 590° C. and milled. A single aqueous washcoat was formed by dispersed the thermally-fixed impregnated supports in water and acid (e.g. acetic acid). Also, promoters of Ba and Zr were dispersed therein. The slurry was milled and coated onto a monolith at a loading of 2.91 g/in$^3$, dried at 110° C. in air and calcined at 590° C. in air.

For the top layer, two impregnated supports were prepared in accordance with the steps of Example 2. The first impregnated support was prepared by adding a rhodium nitrate solution diluted to minimize the metal concentration to 0.40 g/in$^3$ of high-surface area gamma-alumina-ceria resulting in 1.5 g/ft$^3$ Rh. The second impregnated support was prepared by adding a palladium nitrate solution diluted to minimize the metal concentration to 0.40 g/in$^3$ of a ceria-zirconia composite (CeO$_2$: 10 weight %) resulting in 14.1 g/ft$^3$ Pd. The two resulting impregnated powders were individually thermally-fixed at 590° C. and milled. A single aqueous washcoat was formed by dispersed the thermally-fixed impregnated supports in water and acid (e.g. acetic acid). Also, promoters of Ba and Zr were dispersed therein. The slurry was milled and coated onto the two-metal bottom coat at a loading of 0.91 g/in$^3$, dried at 110° C. in air and calcined at 590° C. in air.

Example 7

Data

Examples 2 and 3 were aged for 80 hours at maximum 1050° C. under exothermic conditions on engine. Under New European Drive Cycle (NEDC) conditions on a dynamic engine bench, the performance of such samples was evaluated by measuring the HC, CO and NOx emissions where there was no difference between the two samples in HC and NOx performance and there was a slight advantage for Example 2 in CO performance. The data was as follows:

| Emissions | Example 3 Comparative | Example 2 |
| --- | --- | --- |
| HC (g/km) | 0.071 | 0.069 |
| CO/10 (g/km) | 0.094 | 0.0782 |
| NOx (g/km) | 0.087 | 0.086 |

Examples 4 and 3 were aged for 100 hours at maximum 1030° C. under fuel-cut conditions on engine. Under New European Drive Cycle (NEDC) conditions on a dynamic engine bench, the performance of such samples was evaluated by measuring the HC, CO and NOx emissions where there was significantly better HC and NOx performance for Example 4 and there was no significant difference between the two samples in CO performance. The data was as follows:

| Emissions | Example 3 Comparative | Example 4 |
| --- | --- | --- |
| HC (g/km) | 0.177 | 0.141 |
| CO/10 (g/km) | 0.0678 | 0.0638 |
| NOx (g/km) | 0.125 | 0.099 |

Examples 4 and 5 were aged for 100 hours at maximum 1030° C. under fuel-cut conditions on engine. Under New European Drive Cycle (NEDC) conditions on a dynamic engine bench, the performance of such samples was evaluated by measuring the HC, CO and NOx emissions where there was significantly better HC and NOx performance for Example 5 and there a slight advantage in CO performance for Example 5. The data was as follows:

| Emissions | Example 5 | Example 4 |
| --- | --- | --- |
| HC (g/km) | 0.104 | 0.117 |
| CO/10 (g/km) | 0.143 | 0.150 |
| NOx (g/km) | 0.086 | 0.115 |

Examples 4 and 6 were aged for 100 hours at maximum 1030° C. under fuel-cut conditions on engine. Under New European Drive Cycle (NEDC) conditions on a dynamic engine bench, the performance of such samples was evaluated by measuring the HC, CO and NOx emissions where there was significantly better HC, CO, and NOx performance for Example 6. The data was as follows:

| Emissions | Example 6 | Example 4 |
|---|---|---|
| HC (g/km) | 0.10 | 0.117 |
| CO/10 (g/km) | 0.13 | 0.150 |
| NOx (g/km) | 0.075 | 0.115 |

Example 8

For preparation of a catalyst composite comprising a single layered catalyst having a tri-metal layer, three impregnated supports were prepared. The first impregnated support was prepared by adding a rhodium nitrate solution to 0.43 g/in$^3$ of high-surface area gamma-alumina resulting in 4 g/ft$^3$ Rh. The second impregnated support was prepared by adding a palladium nitrate solution to 2.25 g/in$^3$ of a ceria-zirconia composite (CeO$_2$: 30 weight %) resulting in 82.8 g/ft$^3$ Pd. The third impregnated support was prepared by adding both a palladium nitrate solution and a platinum nitrate solution to 1.0 g/in$^3$ of a high surface area gamma-alumina resulting in 7.2 g/ft$^3$ Pd and 24 g/ft$^3$ Pt. The three resulting impregnated powders were individually thermally-fixed at 590° C. and milled. A single aqueous washcoat was formed by dispersed the thermally-fixed impregnated supports in water and acid (e.g. acetic acid). Also, promoters of Ba and Zr were dispersed therein. The slurry was milled and coated onto a monolith at a loading of 3.66 g/in$^3$, dried at 110° C. in air and calcined at 590° C. in air.

Example 9

A two-layered catalyst composite having a dual Pd—Rh metal layer in the bottom layer and a Pt—Pd top layer was prepared. Its overall composition of supports and precious metals was the same as that of Example 8. For the bottom layer, two impregnated supports were prepared in accordance with the steps of Example 2. The first impregnated support was prepared by adding a rhodium nitrate solution to 0.43 g/in$^3$ of high-surface area gamma-alumina-ceria resulting in 4 g/ft$^3$ Rh. The second impregnated support was prepared by adding a palladium nitrate solution to 2.25 g/in$^3$ of a ceria-zirconia composite (CeO$_2$: 30 weight %) resulting in 82.8 g/ft$^3$ Pd. The two resulting impregnated powders were individually thermally-fixed at 590° C. and milled. A single aqueous washcoat was formed by dispersed the thermally-fixed impregnated supports in water and acid (e.g. acetic acid). Also, promoters of Ba and Zr were dispersed therein. The slurry was milled and coated onto a monolith at a loading of 2.94 g/in$^3$, dried at 110° C. in air and calcined at 590° C. in air.

For the top layer, a third impregnated support was prepared in accordance with the steps of Example 8. The third impregnated support was prepared by adding both a palladium nitrate solution and a platinum nitrate solution to 1.0 g/in$^3$ of a high surface area gamma-alumina resulting in 7.2 g/ft$^3$ Pd and 24 g/ft$^3$ Pt. The resulting impregnated powder was thermally-fixed at 590° C. and milled. A single aqueous washcoat was formed by dispersed the thermally-fixed impregnated supports in water and acid (e.g. acetic acid). Also, promoters of Ba and Zr were dispersed therein. The slurry was milled and coated onto the two-metal bottom coat at a loading of 1.16 g/in$^3$, dried at 110° C. in air and calcined at 590° C. in air.

Example 10

Data

A system was prepared for downstream of a gasoline engine. A three-way conversion (TWC) catalyst composite was placed in a close-coupled position. Downstream of the close-coupled TWC catalyst composite, the catalyst composite of either Example 8 or 9 was placed upstream of a NOx abatement catalyst that was a lean NOx trap catalyst.

The systems were aged for 64 hours at 950° C. under exothermic conditions on engine. The performances of such systems downstream of the catalyst composite of either Example 8 or 9 in a lean gasoline direct inject (GDI) engine exhaust stream were evaluated by measuring the HC, CO and NOx emissions where there was no difference between the two samples in HC performance, but for CO and NOx, Example 9 provided significantly better conversions. The conversion data follows:

| Conversion, % | Example 8 | Example 9 |
|---|---|---|
| HC | 21.66 | 21.79 |
| CO | 28.86 | 32.47 |
| NOx | 37.58 | 42.87 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. An automotive catalyst composite comprising:
    a catalytic material on a carrier, the catalytic material comprising a two-metal layer that comprises:
    a rhodium component supported by a first support comprising a refractory metal oxide component and optionally further a first ceria-zirconia composite;
    a palladium component supported by a second support comprising a second ceria-zirconia composite;
    one or more of a promoter, stabilizer, or binder;
    wherein the catalytic material is effective for three-way conversion (TWC) to substantially simultaneously oxidize carbon monoxide and hydrocarbons and reduce nitrogen oxides, and
    wherein the amount of the total of the first ceria-zirconia composite, if present, and the second ceria-zirconia composite in the two-metal layer is equal to or greater than the amount of the refractory metal oxide component.

2. The composite of claim 1, wherein the palladium component, the rhodium component, or both are thermally-fixed.

3. The composite of claim 1, wherein the first support for the rhodium component comprises an alumina-based support or a zirconium-based support.

4. The composite of claim 3, wherein the first support for the rhodium component comprises an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria.

5. The composite of claim 1, wherein the first support for the rhodium component further comprises a ceria-zirconia composite comprising 20% or less by weight of ceria.

6. The composite of claim 1, wherein the second support for the palladium component comprises a ceria-zirconia composite comprising at least 25% by weight of ceria.

7. The composite of claim 1, wherein a weight ratio of the amount of the total of the first and second ceria-zirconia composites to the amount of the refractory metal oxide component in the two-metal layer is greater than 1:1.

8. The composite of claim 7, wherein the weight ratio is 2.5:1 or greater.

9. The composite of claim 8, wherein the weight ratio is 4:1 or greater.

10. The composite of claim 1 further comprising a palladium component on a refractory metal oxide component.

11. The composite of claim 1, wherein the two-metal layer comprises, by weight percent of the two-metal layer:
    the second ceria-zirconia composite in an amount in the range of 40-50%;
    the refractory metal oxide component in an amount in the range of 40-50%; and
    one or more of lanthana, baria, zirconia, and strontium in an amount of up to 10%;
    wherein the second ceria-zirconia composite comprises ceria in an amount in the range of 25-45% by weight of the second ceria-zirconia composite.

12. The composite of claim 1, wherein the two-metal layer comprises, by weight percent of the two-metal layer:
    the second ceria-zirconia composite in an amount in the range of 70-80%;
    the refractory metal oxide component in an amount in the range of 10-20%; and
    one or more of lanthana, baria, zirconia, and strontium in an amount of up to 10%;
    wherein the second ceria-zirconia composite comprises ceria in an amount in the range of 25-45% by weight of the second ceria-zirconia composite.

13. The composite of claim 12, wherein the refractory metal oxide component comprises an alumina-ceria compound.

14. The composite of claim 12 further comprising a second layer over the two-metal layer, the second layer comprising:
    a rhodium component on an activated alumina component selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria; and
    a palladium component on a third ceria-zirconia composite comprising ceria in an amount in the range of 5-20% by weight of the third ceria-zirconia composite.

15. The composite of claim 1, wherein the catalytic material further comprises a second layer over the two-metal layer, the second layer comprising a rhodium component on a third support, a platinum component on a fourth support, a palladium component on a fifth support, or combinations thereof.

16. The composite of claim 15, wherein the second layer comprises the rhodium component on the third support that comprises an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria.

17. The composite of claim 16, wherein the second layer comprises the palladium component on the fifth support that comprises a third ceria-zirconia composite.

18. The composite of claim 1, wherein the catalytic material comprises a single layer.

19. The composite of claim 1, wherein the catalytic material comprises two layers.

20. An exhaust gas treatment system comprising the catalyst composite of claim 1 located downstream of a gasoline engine.

21. The exhaust gas treatment system of claim 20, further comprising a close-coupled three-way conversion (TWC) catalyst composite downstream of the gasoline engine, wherein the catalyst composite is located downstream of the close-coupled TWC catalyst composite and upstream of a NOx abatement catalyst.

22. A method for treating an exhaust gas comprising hydrocarbons, carbon monoxide, and nitrogen oxides comprising: contacting the exhaust gas with the catalyst composite of claim 1.

23. An automotive catalyst composite comprising:
    a catalytic material on a carrier, the catalytic material comprising a two-metal layer that comprises:
    a rhodium component supported by an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria;
    a palladium component thermally-fixed to a ceria-zirconia composite that comprises ceria in an amount in the range of 25-45% by weight of the ceria-zirconia composite;
    one or more of lanthana, baria, and zirconia;
    wherein the catalytic material is effective for three-way conversion (TWC) to substantially simultaneously oxidize carbon monoxide and hydrocarbons and reduce nitrogen oxides, and
    wherein a weight ratio of the amount of the ceria-zirconia composite to the amount of the activated alumina compound in the two-metal layer is 4:1 or greater.

24. The composite of claim 23, wherein the activated alumina compound comprises an alumina-ceria compound.

25. The composite of claim 23 further comprising a second layer over the two-metal layer, the second layer comprising: a rhodium component supported by an activated alumina compound; and a ceria zirconia composite.

26. The composite of claim 25, wherein
    a palladium component is provided on a ceria-zirconia composite that comprises ceria in an amount in the range of 5-20% by weight of the ceria-zirconia composite;
    wherein the amount of the rhodium component in the second layer is approximately the same as the amount of the rhodium component in the two-metal layer.

27. A method of making a catalyst composite comprising:
    forming a three-way conversion (TWC) catalytic material by:
    dispersing a rhodium component onto a first support comprising a refractory metal oxide component or a first ceria-zirconia composite to form a first impregnated support;
    optionally, fixing the rhodium component to the first impregnated support;
    dispersing a palladium component onto a second support comprising a second ceria-zirconia composite to form a second impregnated support;

optionally, fixing the palladium component to the second impregnated support;

thereafter forming an aqueous washcoat dispersion by mixing water, the first and second impregnated supports, and one or more of a promoter, stabilizer, or binder;

coating the aqueous washcoat dispersion onto a carrier to form a two-metal single layer on the carrier;

calcining the two-metal layer to form the catalyst composite;

wherein the catalytic material is effective for three-way conversion (TWC) to substantially simultaneously oxidize carbon monoxide and hydrocarbons and reduce nitrogen oxides, and wherein the amount of the total of the first and second ceria-zirconia composites is equal to or greater than the amount of the refractory metal oxide component in the two-metal layer.

28. The method of claim 27, wherein the palladium component, the rhodium component, or both are thermally-fixed.

29. The method of claim 27 further comprising well-dispersing the rhodium component onto the first support and well-dispersing the palladium component onto the second support.

30. The method of claim 27 further comprising coating a second layer onto the two-metal layer, the second layer comprising a rhodium component on a third support comprising an activated alumina compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria and optionally a platinum component on a fourth support, a palladium component on a fifth support, or both.

* * * * *